United States Patent
Lee et al.

(10) Patent No.: US 11,967,185 B2
(45) Date of Patent: Apr. 23, 2024

(54) ETCS TERMINAL AND CONTROL METHOD FOR THE SAME

(71) Applicants: Hyundai Motor Company, Seoul (KR); Kia Corporation, Seoul (KR)

(72) Inventors: Seung Jae Lee, Gwangmyeong-Si (KR); Haeyoung Kwon, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/083,367

(22) Filed: Dec. 16, 2022

(65) Prior Publication Data

US 2023/0410563 A1  Dec. 21, 2023

(30) Foreign Application Priority Data

Jun. 21, 2022  (KR) .................. 10-2022-0075704

(51) Int. Cl.
*G07B 15/06*  (2011.01)
*G06Q 20/34*  (2012.01)

(52) U.S. Cl.
CPC .......... *G07B 15/06* (2013.01); *G06Q 20/341* (2013.01); *G06Q 2240/00* (2013.01)

(58) Field of Classification Search
CPC ... G07B 15/06; G06Q 20/341; G06Q 2240/00
See application file for complete search history.

(56) References Cited

U.S. PATENT DOCUMENTS

| | | | |
|---|---|---|---|
| 6,687,714 B1* | 2/2004 | Kogen | G06Q 20/4037 |
| 2011/0296182 A1* | 12/2011 | Jia | G06Q 20/3229 |
| | | | 713/168 |
| 2012/0130776 A1* | 5/2012 | Kang | G08G 1/096716 |
| | | | 705/13 |
| 2017/0186246 A1 | 6/2017 | Montealegre | |
| 2018/0025551 A1 | 1/2018 | Centner | |
| 2020/0235945 A1* | 7/2020 | Li | H04L 9/3226 |
| 2023/0237478 A1* | 7/2023 | Zou | G06Q 20/3672 |
| | | | 705/44 |

FOREIGN PATENT DOCUMENTS

| | | | |
|---|---|---|---|
| JP | 2008181197 A | | 8/2008 |
| JP | 2011248816 A | * | 12/2011 |
| KR | 100969926 B1 | | 7/2010 |
| KR | 20110040232 A | | 4/2011 |
| KR | 10-2019-0060323 A | | 6/2019 |

OTHER PUBLICATIONS

Blythe, Philip, "Improving public transport ticketing through smart cards", Jan. 2004, Municipal Engineer 157, pp. 47-54. (Year: 2004).*

* cited by examiner

*Primary Examiner* — Jeff Zimmerman
*Assistant Examiner* — Brian A Tallman
(74) *Attorney, Agent, or Firm* — Banner & Witcoff, Ltd.

(57) ABSTRACT

An electronic toll collection system (ETCS) terminal may include a communication interface connected to a vehicle network of a vehicle, a card socket configured to accommodate insertion of a payment card, a card integrated circuit (IC) chip configured to store card information of an issued card, and a controller configured to activate, based on a user input received via the communication interface, at least one of the card IC chip or the card socket.

20 Claims, 9 Drawing Sheets

| USER INPUT | CARD IC CHIP | CARD SOCKET | TOLL PAYMENT |
|---|---|---|---|
| SELECT PHYSICAL CARD | DEACTIVATE | ACTIVATE | USE CARD INSERTED INTO CARD SOCKET |
| SELECT EMBEDDED CARD | ACTIVATE | DEACTIVATE | USE CARD ISSUED TO CARD IC CHIP |

ETCS TERMINAL AND CONTROL METHOD FOR THE SAME

CROSS-REFERENCE TO RELATED APPLICATION

This application claims the benefit of Korean Patent Application No. 10-2022-0075704, filed on Jun. 21, 2022 in the Korean Intellectual Property Office, the entire content of which is incorporated herein by reference.

TECHNICAL FIELD

The disclosure relates to an electronic toll collection system (ETCS) terminal and a control method for the ETCS terminal.

BACKGROUND

An electronic toll collection system (ETCS) (e.g., Hi-pass for expressways in South Korea) is a system for automatically collecting tolls by using a standardized application interface method of a dedicated short-range communication protocol to reduce traffic delays.

That is, an ETCS is a system for automatically transmitting and receiving charge information between roadside equipment and a vehicle terminal (e.g., on-board equipment or an ETCS terminal) based on dedicated short-range communication technology.

A toll collecting process of an ETCS may involve, after a vehicle enters a toll area, recognizing a type of the vehicle by using a vehicle type classification device and transmitting information by interoperating with a terminal installed in the vehicle through an antenna for transmission and reception of a lane.

Recently, instead of inserting a credit card into an ETCS terminal, a card integrated circuit (IC) chip that is embedded has been deployed in an ETCS terminal, and card information issued by a card company may be input to the card IC chip, thereby preventing structural restrictions or the risk of theft which may occur when a physical payment card (e.g., a credit card) is used.

SUMMARY

Provided are an electronic toll collection system (ETCS) terminal and a control method for the ETCS terminal, wherein the ETCS terminal includes a card socket into which a credit card is inserted and a card integrated circuit (IC) chip for issuing a card via over-the-air (OTA) and activates either the card socket or the card IC chip based on a user input.

An electronic toll collection system (ETCS) terminal, according to one or more embodiments of the present disclosure, may include: a communication interface connected to a vehicle network of a vehicle; a card socket configured to accommodate insertion of a payment card; a card integrated circuit (IC) chip configured to store card information of an issued card; and a controller configured to activate, based on a user input received via the communication interface, at least one of the card IC chip or the card socket.

The user input received via the communication interface may be a first user input. The ETCS terminal may further include an input interface configured to receive a second user input. The controller may be configured to activate at least one of the card IC chip or the card socket further based on the second user input.

The controller may be further configured to, after the card IC chip is activated, process a toll payment via the issued card.

The controller may be configured to, after the card socket is activated, process a toll payment via the payment card inserted into the card socket.

The controller may be further configured to receive a card issuance command. The card issuance command may include a security key and the card information. The controller may be further configured to associate the issued card to the card IC chip, by generating, on the card IC chip and using the security key, a supplementary security domain (SSD) and an applet that correspond to the card information.

The controller may be further configured to transmit, to a server and via the communication interface, card management information corresponding to the issued card.

The card management information may include card identification information, card lifecycle information, card company information, card issuance information, and/or card status information.

The controller may be further configured to: receive a card deletion command comprising an authorization key; and delete the issued card by deleting, using the authorization key, a supplementary security domain (SSD) and an applet that are stored in the card IC chip.

The controller may be further configured to, after the issued card is deleted, transmit, to a server and via the communication interface, a confirmation message.

The deleted card may be a first card. The card information of the deleted card may be first card information. The SSD of the deleted card may be a first SSD. The applet of the deleted card may be a first applet. The controller may be further configured to, after the transmitting of the confirmation message, receive a card issuance command. The card issuance command may include a security key and second card information. The controller may be further configured to associate a second card to the card IC chip, by generating, on the card IC chip and using the security key, a second SSD and a second applet that correspond to the second card information.

A method, according to one or more embodiments of the present disclosure, may include: identifying, by an electronic toll collection system (ETCS) terminal associated with a vehicle, a payment card inserted into a card socket of the ETCS terminal. The ETCS may include a card integrated circuit (IC) chip storing card information of an issued card. The method may further include: receiving, by the ETCS terminal and via a communication interface connected to a vehicle network of the vehicle, a user input; and activating, by the ETCS terminal and based on the user input, at least one of the card IC chip or the card socket.

The user input received via the communication interface may be a first user input. Activating of the at least one of the card IC chip or the card socket may be further based on a second user input received via an input interface of the ETCS terminal.

The method may further include, after the card IC chip is activated, processing a toll payment via the issued card.

The method may further include, after the card socket is activated, processing a toll payment via the payment card inserted into the card socket.

The method may further include receiving a card issuance command. The card issuance command may include a security key and the card information. The method may further include issuing a card to the card IC chip, by generating, on the card IC chip and using the security key, a supplementary security domain (SSD) and an applet that correspond to the card information.

The method may further include transmitting, to a server and via the communication interface, card management information corresponding to the issued card.

The card management information may include card identification information, card lifecycle information, card company information, card issuance information, and/or card status information.

The method may further include: receiving a card deletion command comprising an authorization key; and deleting the issued card by deleting, using the authorization key, a supplementary security domain (SSD) and an applet that are stored in the card IC chip.

The method may further include: after the issued card is deleted, transmitting, to a server and via the communication interface, a confirmation message.

The deleted card may be a first card. The card information of the deleted card may be first card information. The SSD of the deleted card may be a first SSD. The applet of the deleted card may be a first applet. The method further include, after the transmitting of the confirmation message, receiving a card issuance command. The card issuance command may include a security key and second card information. The method may further include issuing a second card to the card IC chip, by generating, on the card IC chip and using the security key, a second SSD and a second applet that correspond to the second card information.

DETAILED DESCRIPTION

The same reference numerals denote the same elements throughout the specification. All elements of embodiments are not described in the specification, and descriptions of matters well known in the art to which the disclosure pertains or repeated descriptions between the embodiments will not be given.

Also, in the present specification, it will be understood that when a part is "connected" to another part, the part may be directly connected to the other part, or may be indirectly connected to the other part, and the indirect connection includes connection through a wireless communication network.

In addition, when a part "includes" a certain element, the part may further include another element instead of excluding the other element, unless otherwise stated.

The singular forms "a," "an," and "the" are intended to include the plural forms as well, unless the context clearly indicates otherwise.

Also, the term such as " . . . unit", " . . . er", " . . . block", " . . . member", or " . . . module" may refer to a unit for processing at least one function or operation. For example, the above term may refer to at least one process performed by at least one hardware such as a field-programmable gate array (FPGA)/application-specific integrated circuit (ASIC), or at least one software or a processor stored in a memory.

Reference numerals used in operations are used to identify the operations, without describing the order of the operations, and the operations may be performed in an order different from the stated order unless a specific order is definitely specified in the context.

Embodiments of an electronic toll collection system (ETCS) terminal and a control method for the same according to an aspect will be described in detail with the attached drawings.

Figure 1:
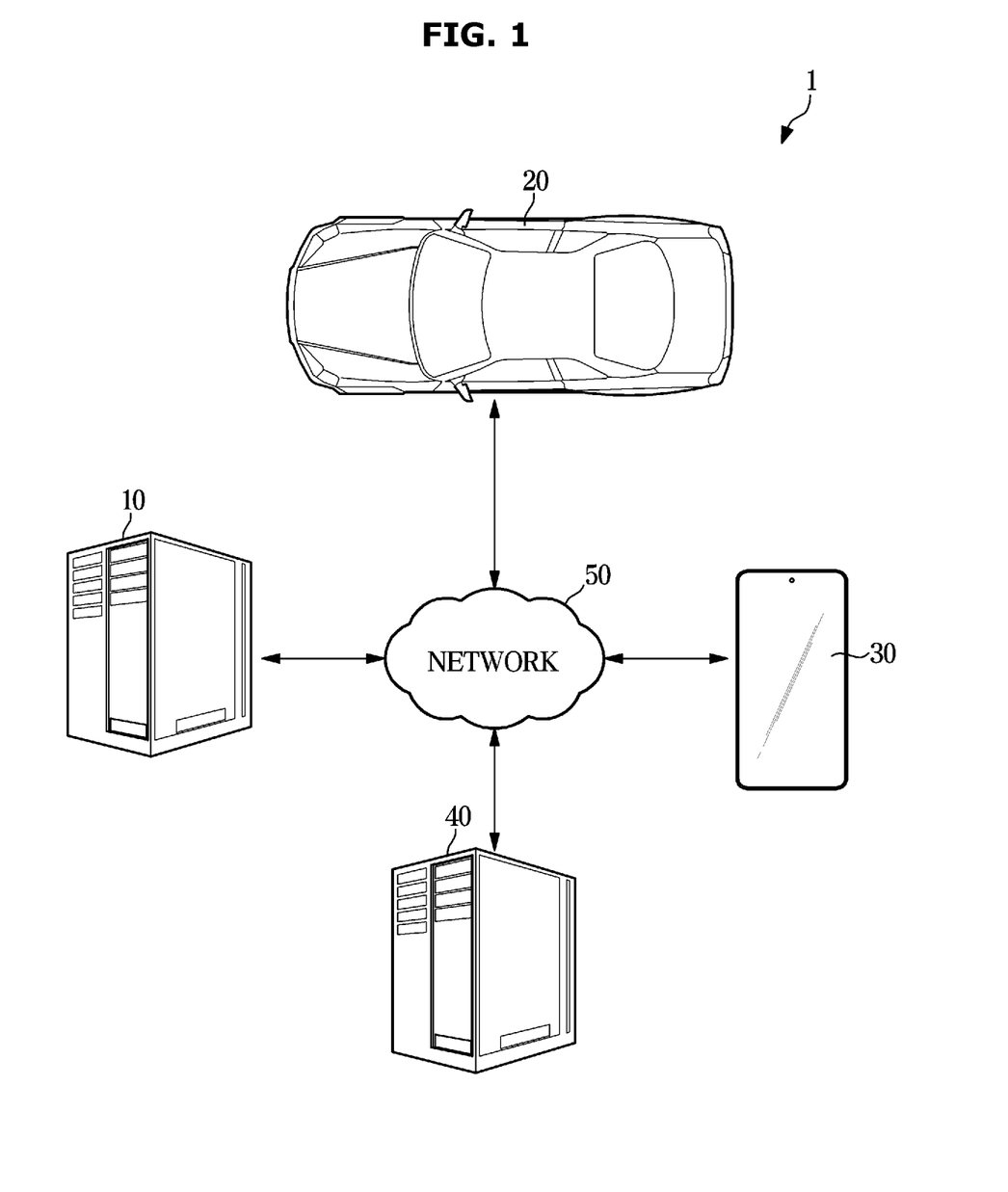
FIG. 1 illustrates an example embedded ETCS card management system.

FIG. 1 illustrates an example embedded ETCS card management system.

Referring to FIG. 1, an ETCS card management system 1 may include a server 10 that provides a connected car service (CCS) for a vehicle 20, the vehicle 20 that includes an ETCS terminal, and a card company server 40 that issues a card to the ETCS terminal. The card may be a payment card such as a credit card, a debit card, a gift card, etc.

The server 10, the vehicle 20, the user terminal 30, and the card company server 40 may each be connected to a network 50 by wire or wirelessly, and may transmit and receive data to and from each other through the network 50.

After the server 10 receives a card issuance request from the user terminal 30, the server 10 may transmit the card issuance request to the card company server 40, may receive card information from the card company server and may transmit a card issuance command, which includes a security key and the card information, to the vehicle 20.

Also, after the server 10 receives a card deletion command from the card company server 40, the server 10 may transmit the card deletion command including an authorization key to the vehicle 20.

Also, the server 10 may manage a card status, by matching and storing customer information with card management information of a card issued to the vehicle. In this case, if there is a change in the card (e.g., new card issuance or card deletion), the server 10 may update the customer information and the card management information.

After the vehicle 20 receives the card issuance command or the card deletion command from the server 10, the vehicle 20 may transmit the card issuance command or the card deletion command to the ETCS terminal.

The ETCS terminal of the vehicle 20 may issue a card to a card integrated circuit (IC) chip or may delete the card issued to the card IC chip, by generating or deleting a supplementary security domain (SSD) and an applet based on the card issuance command or the card deletion command.

In this case, as described above, the ETCS terminal may include not only the card IC chip for issuing or deleting a card via over-the-air (OTA) but also a card socket into which a physical card (e.g., a credit card, a debit card, a gift card, etc.) may be inserted. A card (e.g., a payment card) issued to the card IC chip may be an embedded card or a virtual card.

The ETCS terminal may control either the card IC chip or the card socket to be activated based on a user's selection, and may allow a toll to be paid based on a card issued to the card IC chip if the card IC chip is selected and may allow a toll to be paid based on a card inserted into the card socket if the card socket is selected.

The user terminal 30 may receive an input from a driver of the vehicle 20. For example, the user terminal 30 may receive an input for new card issuance, and may transmit a card issuance request to the server 10 based on the input.

The card company server 40 may generate card information about a card (e.g., a virtual card) to be issued to the card IC chip of the ETCS terminal and may transmit the card information to the server 10, and if a validity period of the card expires or a toll is not paid (e.g., credit card payment is not made on time), the card company server 40 may transmit a card deletion request to the server 10.

As such, the server 10 may manage a card of the ETCS terminal, by controlling a process of issuing a card to the card IC chip of the ETCS terminal or deleting the issued card.

Elements of the ETCS card management system 1 and a relationship between the elements have been described. Each element will now be described in detail.

Figure 2:
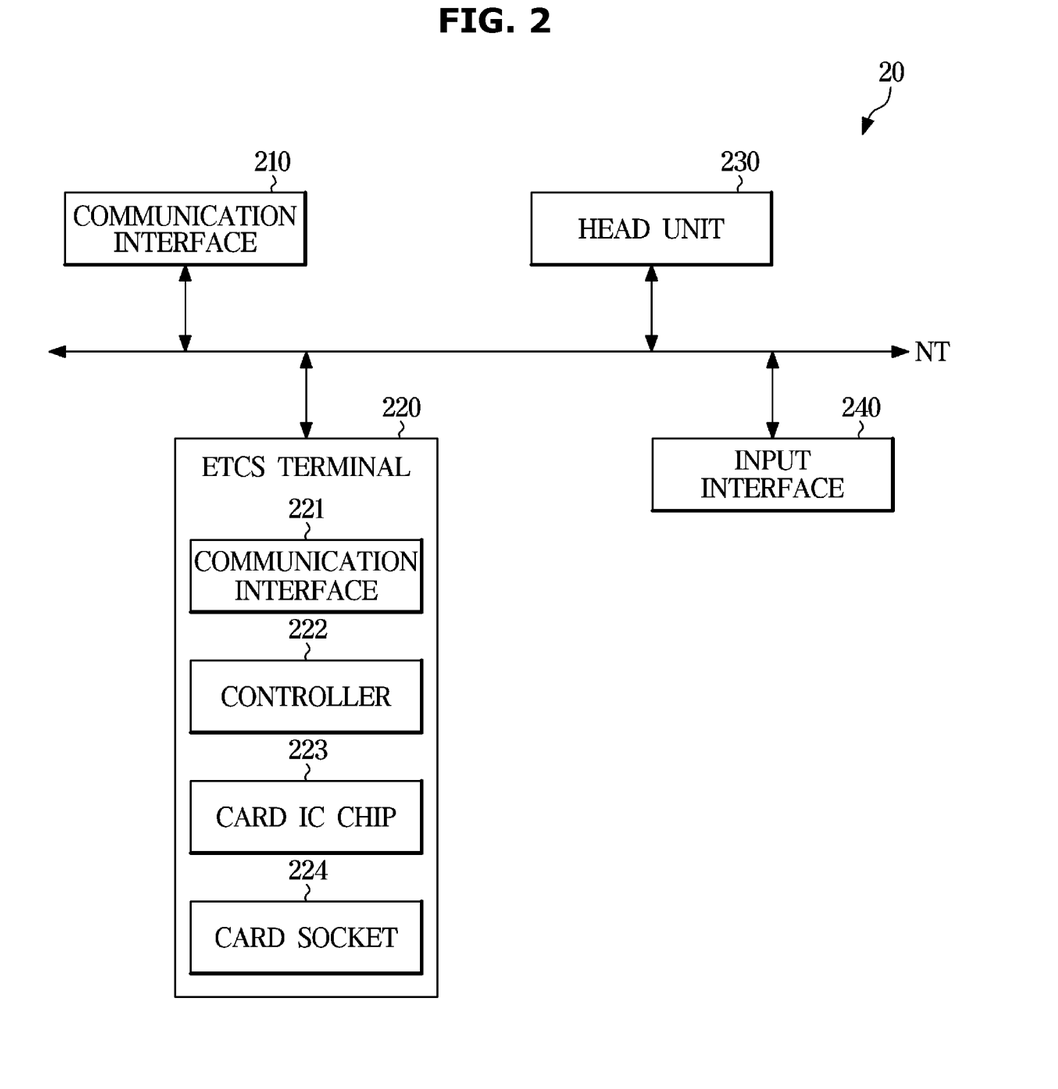
FIG. 2 is a control block diagram of an example vehicle.

FIG. 2 is a control block diagram of the vehicle 20.

Referring to FIG. 2, the vehicle 20 may include a communication interface 210, an ETCS terminal 220 including a card IC chip 223, a head unit (also referred to as an automotive head unit, a dashboard, a console, etc.) 230 that controls a connected car service (CCS), and an input interface 240 that receives a user input.

The communication interface 210, the ETCS terminal 220, the head unit 230, and the input interface 240 may each be connected to a vehicle network NT, and may transmit and receive data to and from each other.

The communication interface 210 may be connected to the network 50 wirelessly, and communicate with the server 10. To this end, the communication interface 210 may correspond to a known type of wireless communication device.

The ETCS terminal 220 may include a communication interface 221 that is connected to the vehicle network NT and performs communication, a controller 22 that controls card issuance and deletion for the card IC chip 223 and selectively activates the card IC chip 223 or a card socket 224 based on a user's selection, the card IC chip 223 to which card information of an issued card is input to perform payment, and a card socket 224 into which a physical card (e.g., a credit card) may be inserted.

The communication interface 221 may be connected to the vehicle network NT and may perform communication. To this end, the communication interface 221 may be provided as a known type of communication device.

The controller 222 may activate either the card IC chip 223 or the card socket 224 based on a user input.

In this case, the user input may be input through the input interface 240 of the vehicle 20 or may be input through the head unit 230. The user input may be transmitted to the ETCS terminal 220 through the communication interface 221. Also, the user input may be input through the user terminal 30, and in this case, the user input may be transmitted to the controller 222 through the communication interface 210 and the communication interface 221.

That is, the controller 222 may activate either the card IC chip 223 or the card socket 224 based on the user input received through the communication interface 221.

Also, the user input may be input based on an input interface (not shown) provided in the ETCS terminal 220.

That is, the controller 222 may activate either the card IC chip 223 or the card socket 224 based on the user input received through the input interface of the ETCS terminal 220.

In this case, if the controller 222 activates the card IC chip 223, the controller 222 may allow a toll to be paid by using a card issued to the card IC chip 223.

Also, if the controller 222 activates the card socket 224, the controller 222 may allow a toll to be paid by using a payment card (e.g., a credit card) inserted into the card socket 224.

If the controller 222 receives a card issuance command, which includes a security key and card information, through the head unit 230, the controller 222 may issue a card (e.g., a virtual card) to the card IC chip 223 by using the security key. In other words, the controller 222 may associate (e.g., register) a card with the card IC chip 223 by using the security key. In detail, the controller 222 may issue a card, by generating a supplementary security domain (SSD) and an applet corresponding to the card information on the card IC chip 223 by using the security key.

After card issuance to the card IC chip 223 is completed, the controller 222 may control card management information corresponding to the issued card to be transmitted to the server 10 through the head unit 230.

The card management information may include at least one of card identification information, card lifecycle information, card company information, card issuance information, or card status information.

If the controller 222 receives a card deletion command including an authorization key from the head unit 230 through the communication interface 221, the controller 222 may delete the card (e.g., a virtual card) issued to the card IC chip by using the authorization key. In this case, if the card issued to the card IC chip is deleted, this may mean that the SSD and the applet corresponding to the card are deleted.

That is, if the controller 222 receives a card deletion command including an authorization key, the controller 222 may delete the card (e.g., a virtual card) issued to the card IC chip, by deleting the SSD and the applet stored in the card IC chip by using the authorization key.

Also, after card deletion from the card IC chip 223 is completed, the controller 222 may cause a confirmation message (e.g., a message confirming success of card deletion) to be transmitted to the server 10 through the head unit 230.

Also, if the controller 221 receives a card issuance command including a security key and card information after the transmitting of the message confirming success of card deletion, the controller 222 may issue a new card (e.g., a new virtual card) to the card IC chip, by generating an SSD and an applet corresponding to the card information on the card IC chip by using the authorization key.

The controller 222 may include at least one instance of memory in which a program (e.g., computer-executable instructions) for performing an operation described above and an operation described below is stored, and at least one processor for executing the stored program. If a plurality of memories and/or a plurality of processors are provided, the plurality of memories and the plurality of processors may be integrated into one chip, or may be implemented physically separate components.

The card IC chip 223 may perform payment based on card information of an issued card (e.g., an issued virtual payment card). That is, the card IC chip 223 may perform payment based on charge information received from roadside equipment.

To this end, the card IC chip 223 may include an issuer security domain (ISD) that is first permanently loaded onto the card IC chip 223 by an initial card issuer (e.g., a manufacturer of the vehicle 20), and an SSD that is loaded by a service provider (e.g., a card company) that provides a payment service to manage a separate key. In this case, deletion and change of the card information may only be performed by the ISD, and a structure of a security domain (SD) including the ISD and the SSD may comply with a global platform (GP) card standard.

A physical payment card (e.g., a credit card, a debit card, a gift card, etc.) may be inserted into the card socket 224, and the card socket 224 may include at least one contact terminal that may contact an integrated circuit (IC) memory of the physical card.

In this case, the card socket 224 may process a transaction based on charge information received from roadside equipment, by recording payment information on the IC memory of the physical card according to a known standard procedure.

The head unit 230 may control a CCS. That is, the head unit 230 may store CCS subscription information, and may transmit and receive data to and from the server 10 through the communication interface 210 based on the CCS subscription information.

For example, the head unit 230 may receive a card issuance command or a card deletion command from the server 10 through the communication interface 210, and may transmit the card issuance command or the card deletion command received from the server 10 to the ETCS terminal 220 through the communication interface 210.

The input interface 240 may receive a user input, and may be provided as a known type of input device. In particular, the input interface 240 may receive a user input for selecting an object to perform payment from among the card IC chip 223 and the card socket 224 of the ETCS terminal 220.

Each element of the vehicle 20 has been described. A case where the ETCS terminal 220 selects an object to perform payment based on a user input will now be described in detail.

Figure 3:
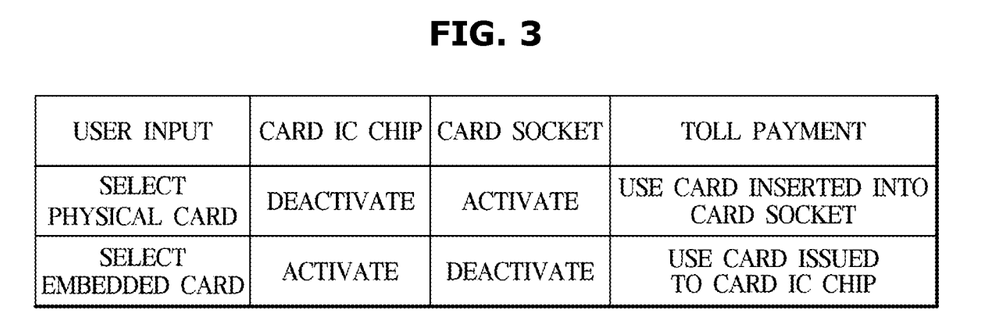
FIG. 3 is a view illustrating an example ETCS terminal activating a card integrated circuit (IC) chip or a card socket based on a user input.

FIG. 3 is a view for describing a case where the electronic toll collection system (ETCS) terminal 220 activates either the card IC chip 223 or the card socket 224 based on a user input.

Referring to FIG. 3, the ETCS terminal 220 may activate either the card IC chip 223 or the card socket 224 based on a user input.

For example, if the ETCS terminal 220 receives a user input that indicated selection of a physical card, the ETCS terminal 220 may deactivate the card IC chip 223, and may activate the card socket 224, to allow a toll to be paid by using a physical card inserted into the card socket 224.

If the ETCS terminal 220 receives a user input that indicates selection of an embedded card (e.g., a virtual card), the ETCS terminal 220 may activate the card IC chip, and may deactivate the card socket 224, to allow a toll to be paid by using a card (e.g., a virtual card, an embedded card, etc.) issued to the card IC chip.

As such, the ETCS terminal 220 may selectively use an embedded card or a physical card according to a user's selection, thereby improving the user's convenience and usability. Furthermore, if it is difficult to use a physical card, for example, if a physical card is not inserted, if a physical card is old (e.g., expired), or if a contact point of a physical card is defective or damaged, the ETCS terminal 220 may easily use an embedded card, thereby preventing an ETCS payment error.

In this case, the user may easily have a card issued (e.g., registered) to the card IC chip 223 without a physical card, and the card may be issued to the card IC chip 223 embedded in the ETCS terminal 220, thereby preventing poor contact at the card socket 224.

A case where the ETCS terminal 220 issues a card to the card IC chip 223 will be described in detail.

Figure 4:
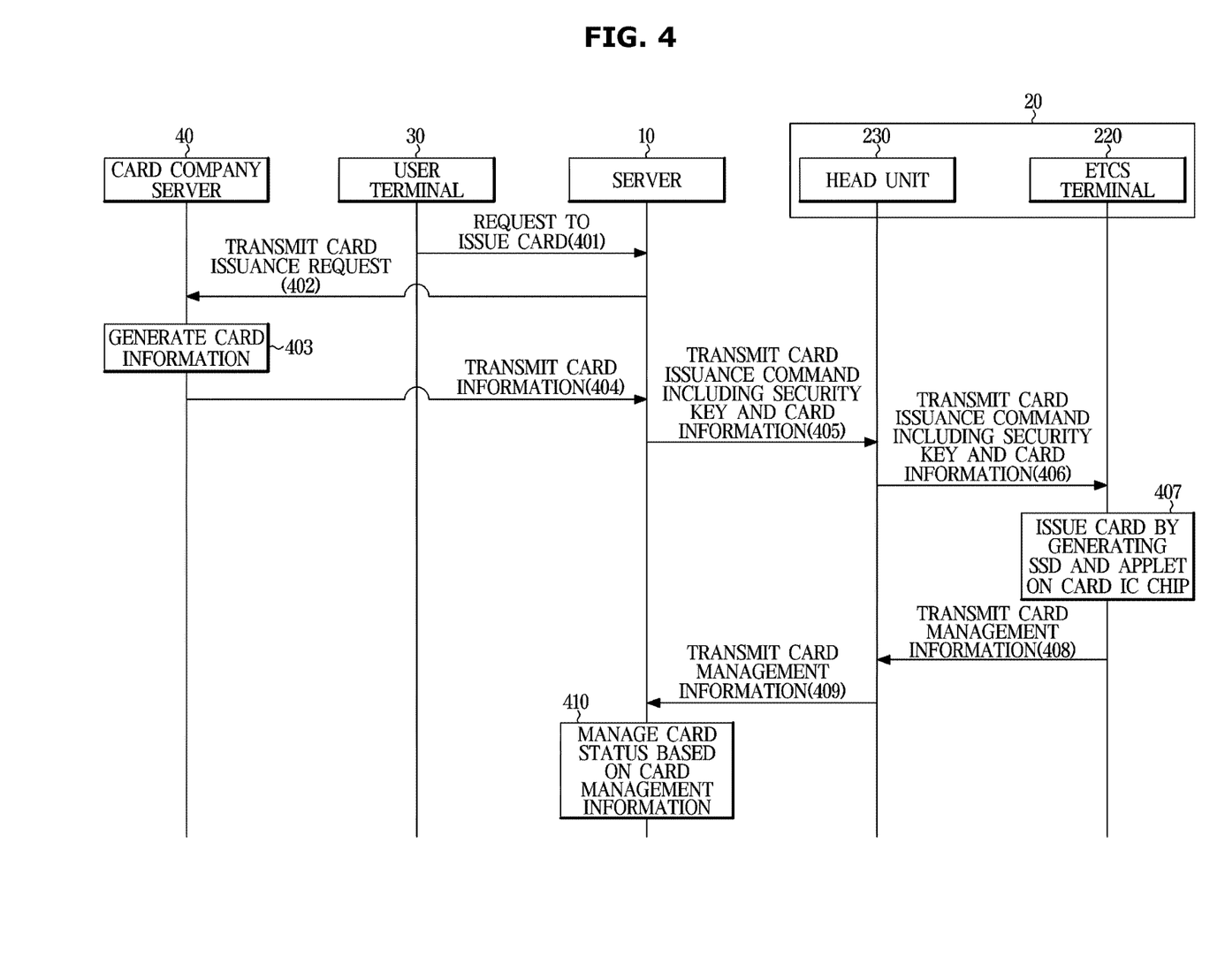
FIG. 4 is a signal flowchart illustrating an example ETCS terminal issuing a card to a card IC chip.
Figure 5:
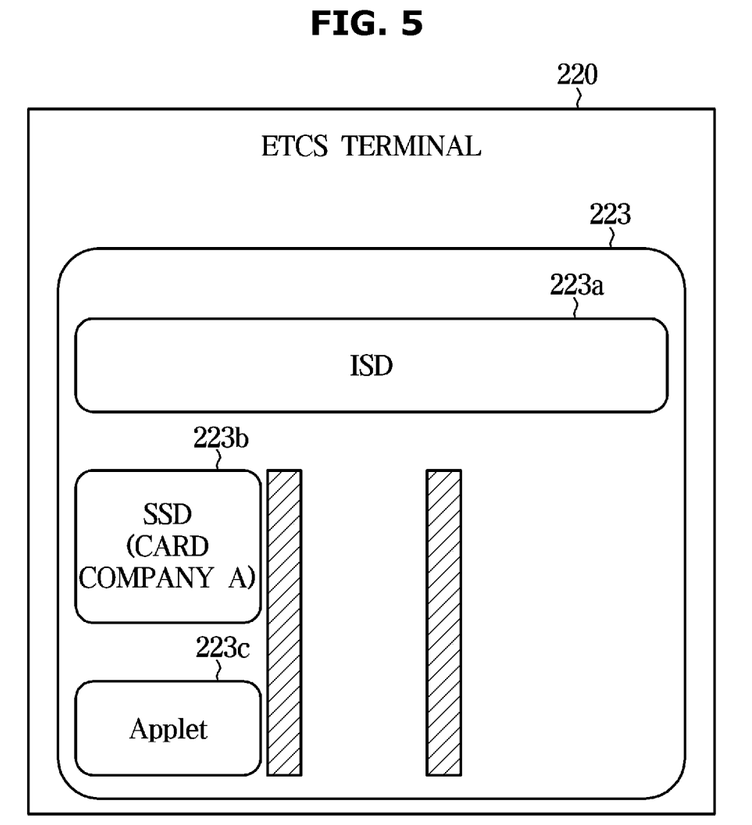
FIG. 5 is a view illustrating an example ETCS terminal issuing a card to a card IC chip.

FIG. 4 is a signal flowchart illustrating the ETCS terminal 220 issuing a card to the card IC chip 223. FIG. 5 is a view illustrating the ETCS terminal 220 issuing a card to the card IC chip 223.

Referring to FIG. 4, the user terminal 30 may request the server 10 to issue a card based on a user input (401). Issuing a card (e.g., a payment card) may include generating information unique to the card, such as card information, and creating a user account associated with the card.

If the server 10 receives a card issuance request from the user terminal the server 10 may transmit the card issuance request to the card company server 40 corresponding to the card issuance request (402).

In this case, the card company server 40 may generate card information based on the card issuance request (403), and may transmit the card information to the server 10 (404). In this case, the card information may include a validity period (e.g., an expiration date), a card serial number, customer information for card issuance, and vehicle information for card issuance.

If the server 10 receives the card information from the card company server 40, the server 10 may transmit, to the vehicle 20, a card issuance command that includes a security key and the card information (405).

The security key may correspond to a key (e.g., a cryptographic key) having the authority to issue a card, and may be issued by a personal secure application module (PerSAM). The PerSAM may be a security device used to safely transmit a key to issue a card (e.g., electronic money), and the PerSAM may correspond to a card-type device that should be used according to a designated procedure. That is, the PerSAM that is a module having key information necessary for issuance may be provided by a transit authority (e.g., a highway corporation) in charge of an ETCS.

Also, the card issuance command may include an SSD generation command and an applet generation command.

If the head unit 230 receives the card issuance command from the server the head unit 230 may transmit the card issuance command to the ETCS terminal 220 (406), and the ETCS terminal 220 may issue a card by generating an SSD and an applet on the card IC chip 223 (407).

In detail, as shown in FIG. 5, if the ETCS terminal 220 receives the card issuance command including the security key and the card information, the ETCS terminal 220 may issue a card, by generating an SSD 223b and an applet 223c corresponding to the card information on the card IC chip 223. In this case, the SSD 223b and the applet 223c may be generated by an ISD 223a.

Next, the ETS terminal 220 may transmit card management information to the head unit 230 (408), and the head unit 230 may transmit the card management information to the server 10. That is, after card issuance to the card IC chip 223 is completed, the ETCS terminal 220 may transmit the card management information of the issued card to the server 10 through the head unit 230.

The card management information may include at least one of card identification information for identifying the card, card lifecycle information indicating a lifecycle of the card (e.g., blank card or issuance completion), card company information of the card, card issuance information of the card, and/or card status information of the card.

If the server 10 receives the card management information from the vehicle 20, the server 10 may manage a card status based on the card management information (410). That is, the server 10 may manage customer information and the card management information issued to the vehicle 20, by matching and storing the customer information with the card management information issued to the vehicle 20.

Figure 6:
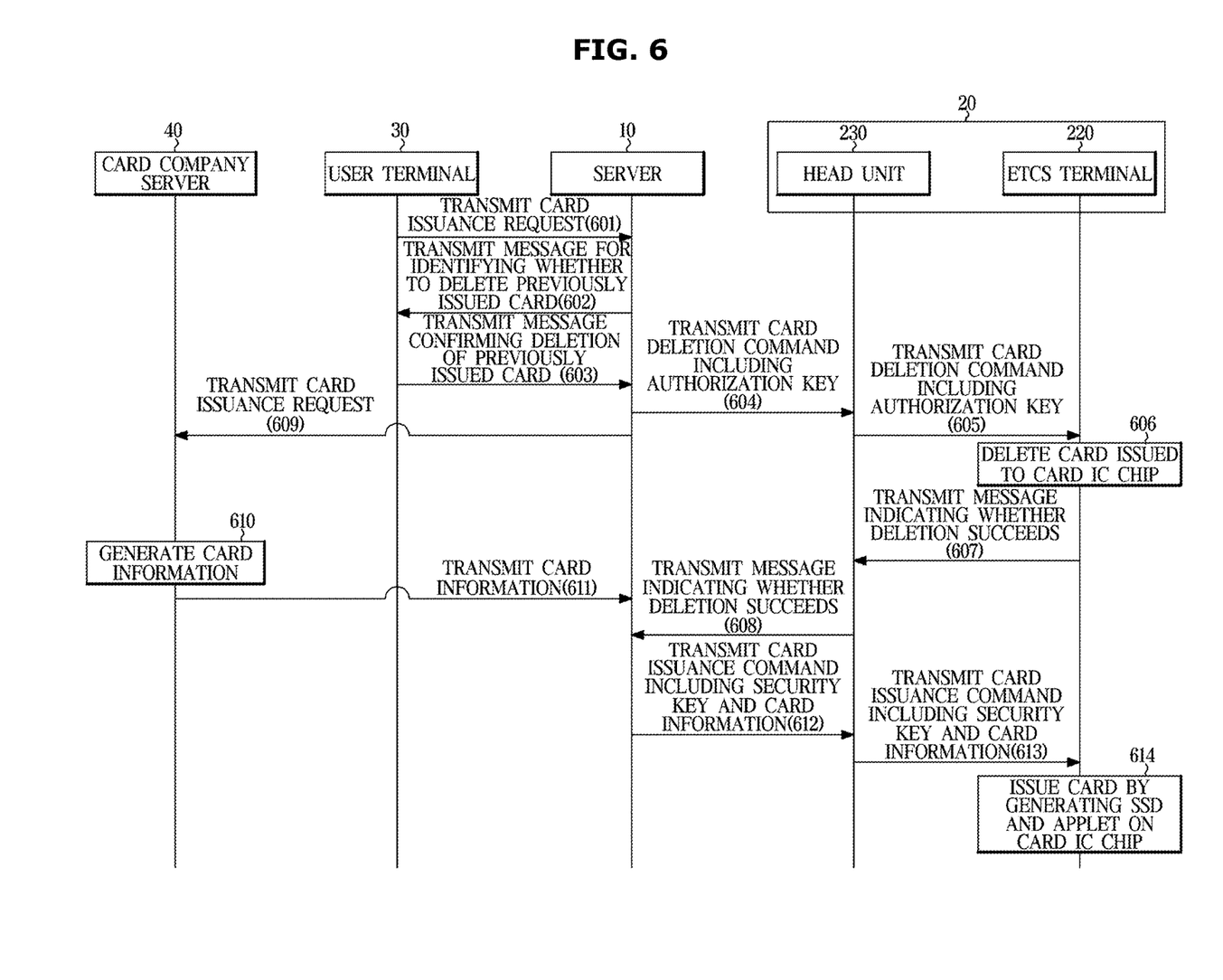
FIG. 6 is a signal flowchart illustrating an example ETCS terminal deleting a card issued to a card IC chip.
Figure 7:
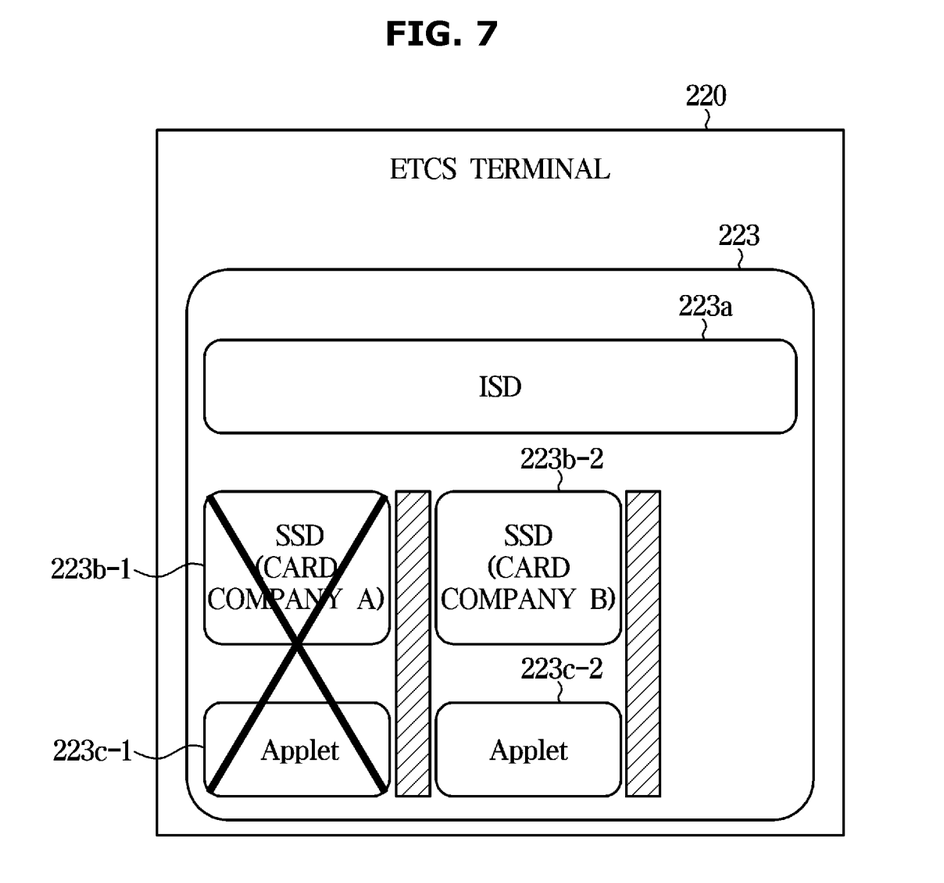
FIG. 7 is a view illustrating an example ETCS terminal deleting a card issued to a card IC chip.

FIG. 6 is a signal flowchart illustrating the ETCS terminal 220 deleting a card issued to the card IC chip 223. FIG. 7 is a view for describing a case where the ETCS terminal 220 deletes a card issued to the card IC chip 223.

Referring to FIG. 6, the user terminal 30 may transmit a card issuance request to the server 10 according to a user input (601).

If there is a previously issued card in the ETCS terminal 220, the server 10 may control the communication interface 110 to transmit, to the user terminal a message for identifying whether to delete the previously issued card (602).

In this case, the user terminal 30 may transmit a message confirming deletion of the previously issued card (a previously issued card deletion command) to the server 10 based on the user input (603).

If the server 10 receives the previously issued card deletion command from the user terminal 30 through the communication interface 110, the server 10 may transmit a card deletion command including an authorization key to the vehicle 20 (604). In this case, the authorization key may correspond to a key having the authority to delete a card, and may be issued by a PerSAM. The card deletion command may include an SSD deletion command and an applet deletion command.

The head unit 230 receiving the card deletion command may transmit the card deletion command to the ETCS terminal 220 (605).

If the ETCS terminal 220 receives the card deletion command including the authorization key from the head unit 230 through the communication interface 221, the ETCS terminal 220 may delete the card issued to the card IC chip by using the authorization key. In this case, if the card issued to the card IC chip is deleted, it may mean that an SSD 223b-1 and an applet 223c-1 corresponding to the card are deleted as described with reference to FIG. 7.

That is, if the ETCS terminal 220 receives the card deletion command including the authorization key, the ETCS terminal 220 may delete the card issued to the card IC chip 223, by deleting an SSD and an applet stored in the card IC chip 223 by using the authorization key.

Also, the ETCS terminal 220 may transmit, to the head unit 230, a message indicating whether the card issued to the card IC chip 223 was successfully deleted (607), and the head unit 230 may transmit, to the server 10, a confirmation message (e.g., a message indicating whether deletion of the card was successful (608).

After card deletion from the card IC chip 223 is completed, the ETCS terminal 220 may transmit a message confirming success of card deletion to the server 10 through the head unit 230.

Also, the server 10 may transmit a card issuance request to the card company server 40 corresponding to the card issuance request (609).

In this case, the card company server 40 may generate card information based on the card issuance request (610), and may transmit the card information to the server 10 (611). In this case, the card information may include a validity period, a card serial number, customer information for card issuance, and vehicle information for card issuance.

If the server 10 receives the card information from the card company server 40, the server 10 may transmit a card issuance command including a security key and the card information to the vehicle 20 (612).

If the head unit 230 receives the card issuance command from the server the head unit 230 may transmit the card issuance command to the ETCS terminal 220 (613), and the ETCS terminal 220 may issue a card (e.g., a new card) by generating an SSD and an applet on the card IC chip 223 (614).

In detail, as shown in FIG. 7, the ETCS terminal 220 may issue a card, by generating an SSD 223b-2 and an applet 223c-2 corresponding to the card information on the card IC chip 223 by using the security key. In this case, the SSD 223b-2 and the applet 223c-2 may be generated by the ISD 223a.

In other words, if the ETCS terminal 220 receives the card issuance command including the security key and the card information after the transmitting of the message confirming success of card deletion, the ETCS terminal 220 may issue a new card (e.g., a new virtual card) to the card IC chip 223, by generating the SSD 223b-2 and the applet 223c-2 corresponding to the card information by using the security key.

Next, the ETCS terminal 220 may transmit card management information to the head unit 230, and the head unit 230 may transmit a confirmation message (e.g., a message indicating whether issuance was successful) to the server 10. That is, after card issuance to the card IC chip 223 is completed, the ETCS terminal 220 may transmit the card management information to the server 10 through the head unit 230.

If the server 10 receives the card management information from the vehicle 20, the server 10 may manage a card status based on the card management information. That is, the server 10 may manage customer information and the card management information of the card issued to the vehicle 20, by matching and updating the customer information with the card management information of the card issued to the vehicle 20.

A control method for the ETCS terminal 220 according to an aspect will now be described. The ETCS terminal 220 may be used in the control method for the ETCS terminal 220. Accordingly, the description made with reference to FIGS. 1 to 7 may apply to the control method for the ETCS terminal 220.

Figure 8:
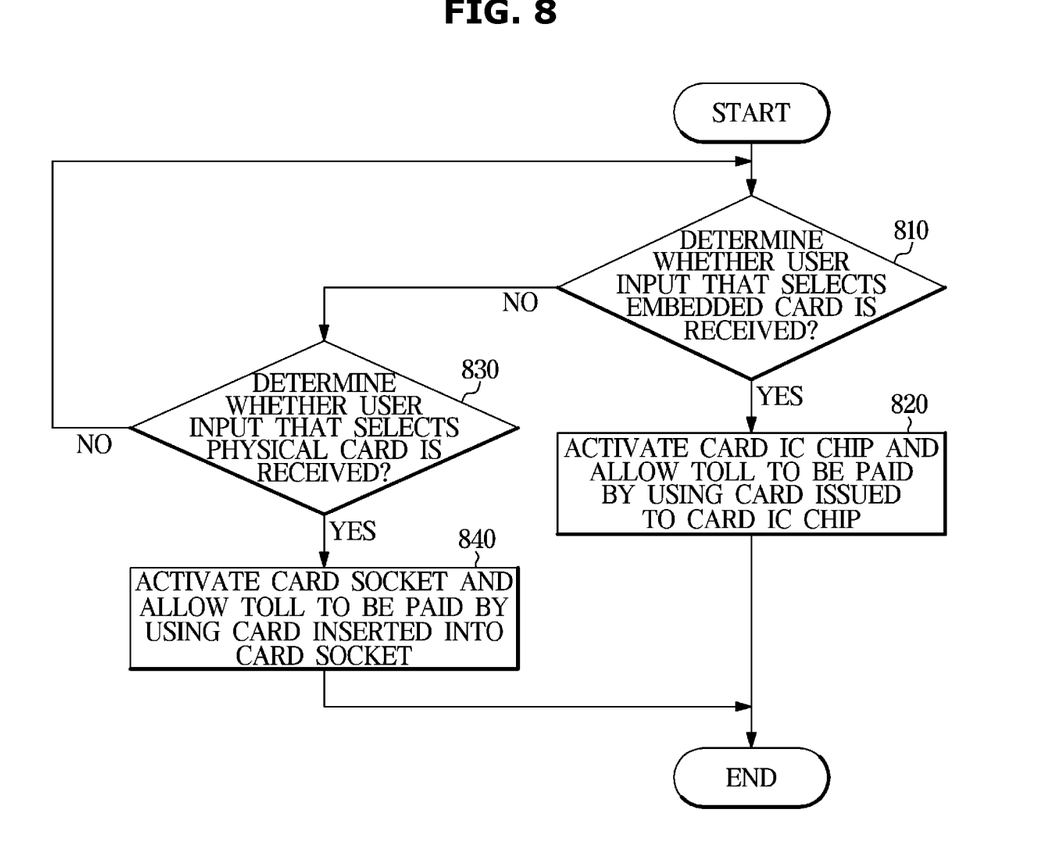
FIG. 8 is a flowchart illustrating an example card, for paying a toll, being selected based on a user input in a control method for an ETCS terminal.

FIG. 8 is a flowchart illustrating an example card, for paying a toll, being selected based on a user input in a control method for the ETCS terminal 220.

Referring to FIG. 8, if the ETCS terminal 220 receives a user input that indicates selection of an embedded card (yes in 810), the ETCS terminal 220 activates the card IC chip 223 and allows a toll to be paid by using a card issued to the card IC chip 223 (820).

Also, if the ETCS terminal 220 receives a user input that indicates selection of a physical card (yes in 830), the ETCS terminal 220 activates the card socket 224 and allows a toll to be paid by using a card inserted into the card socket 224 (840).

As such, the ETCS terminal 220 may selectively use an embedded card or a physical card according to a user's selection, thereby improving the user's usability. Furthermore, if it is difficult to use a physical card, for example, if a physical card is not inserted, if a physical card is old (e.g., expired), or if a contact point of a physical card is defective or damaged, the ETCS terminal 220 may easily use an embedded card, thereby preventing an ETCS payment error.

In this case, the user may easily receive a card issued to the card IC chip 223 without a physical card, and the card may be issued to the card IC chip 223 embedded in the ETCS terminal 220, thereby preventing poor contact at the card socket 224.

Figure 9:
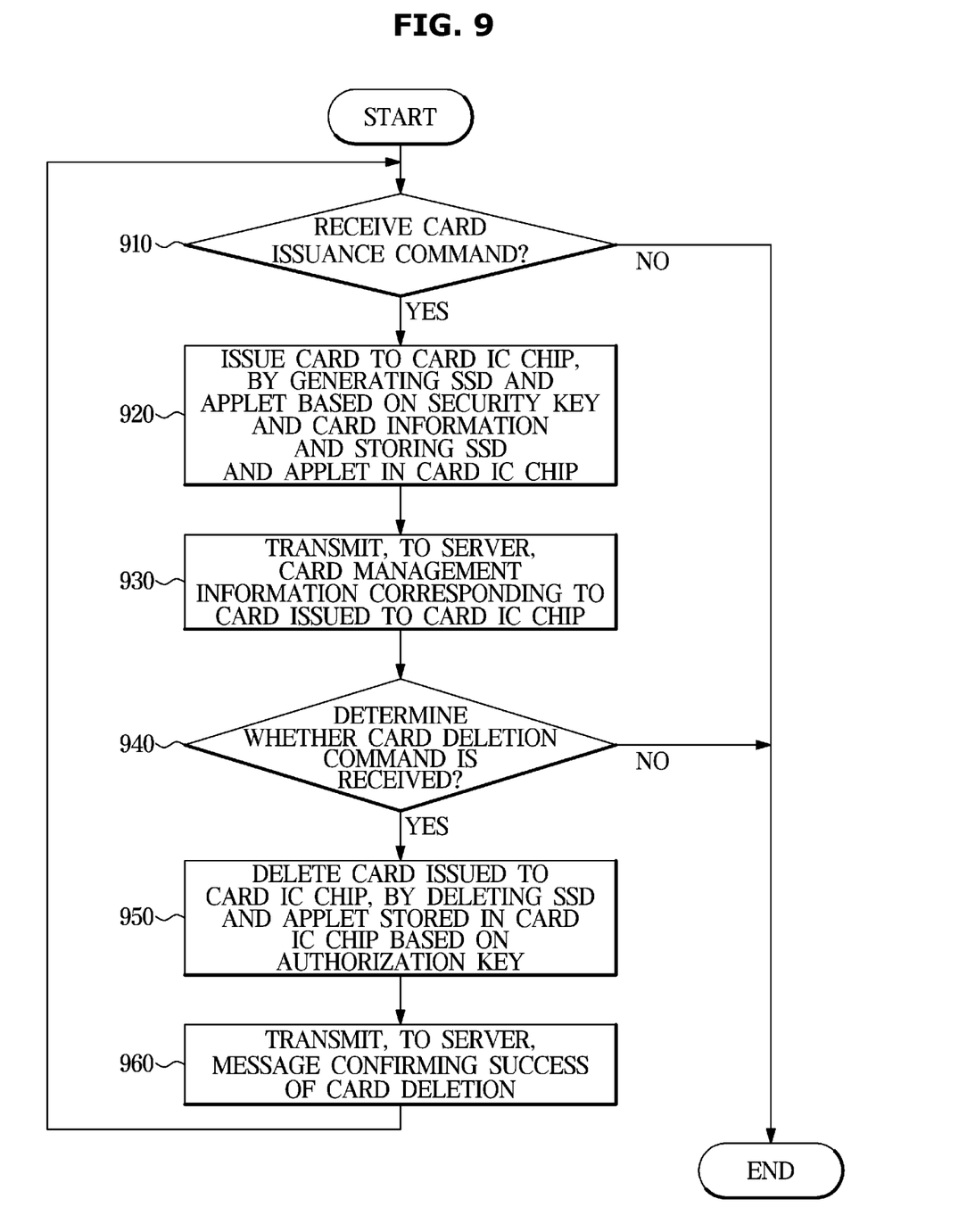
FIG. 9 is a flowchart illustrating an example card issued to a card IC chip is managed in a control method for an ETCS terminal.

FIG. 9 is a flowchart illustrating an example card issued to the card IC chip 223 is managed in a control method for the ETCS terminal 220.

Referring to FIG. 9, if the ETCS terminal 220 receives a card issuance command (yes in 910), the ETCS terminal 220 may issue a card to the card IC chip 223, by generating and SSD and an applet based on a security key and card information and storing the SSD and the applet in the card IC chip 223 (920).

Next, the ETCS terminal 220 may transmit card management information corresponding to the card issued to the card IC chip 223 to the server 10 (930).

In this case, the card management information may include at least one of card identification information for identifying the card, card lifecycle information indicating a lifecycle (e.g., blank card or issuance completion) of the card, card company information of the card, card issuance information of the card, or card status information of the card.

Also, if the ETCS terminal 220 receives a card deletion command (yes in 940), the ETCS terminal 220 may delete a card issued to the card IC chip 223, by deleting an SSD and an applet stored in the card IC chip 223 based on an authorization key (950).

That is, if the ETCS terminal 220 receives a card deletion command including an authorization key, the ETCS terminal 220 may delete the card issued to the card IC chip 223, by deleting the SSD and the applet stored in the card IC chip 223 by using the authorization key.

Next, the ETCS terminal 220 may transmit a message confirming success of card deletion to the server 10 (960).

That is, the ETCS terminal 220 may transmit a message indicating whether deletion of the card issued to the card IC chip 223 succeeds to the head unit 230, and the head unit 230 may transmit the message indicating whether deletion of the card succeeds to the server 10.

Accordingly, after card deletion from the card IC chip 223 is completed, the ETCS terminal 220 may transmit the message confirming success of card deletion to the server 10 through the head unit 230.

As is apparent from the above, an electronic toll collection system (ETCS) terminal and a control method for the same, because the ETCS terminal includes a card socket into which a payment card (e.g., credit card) is inserted and a card integrated circuit (IC) chip for issuing a card via over-the-air (OTA) and activates either the card socket or the card IC chip based on a user input, any one of embedded card and a physical card may be selectively used and an error caused by the use of the physical card may be minimized.

Disclosed embodiments may be implemented on a recording medium storing instructions executable by a computer. The Instructions may be stored as program code, and when being executed by a processor, may cause a program module to be generated and operations of the disclosed embodiments to be performed. The recording medium may be implemented as a computer-readable recording medium.

The computer-readable recording medium includes any type of recording medium in which instructions readable by a computer are stored. Examples of the recording medium may include a read-only memory (ROM), a random-access memory (RAM), a magnetic tape, a magnetic disk, a flash memory, and an optical data storage.

The disclosed embodiments have been described with reference to the attached drawings. It will be understood by one of ordinary skill in the art that the embodiments may be easily modified in other specific forms without changing the technical spirit or the essential features of the disclosure. The disclosed embodiments are non-limiting examples of the disclosure, and should be considered in a descriptive sense only and not for purposes of limitation.

What is claimed is:

1. An electronic toll collection system (ETCS) terminal comprising:
  a communication interface connected to a vehicle network of a vehicle;
  a card socket configured to accommodate insertion of a payment card;
  a card integrated circuit (IC) chip configured to store card information of an issued card; and
  a controller configured to:
    activate, based on a user input received via the communication interface, at least one of the card IC chip or the card socket;
    receive a card deletion command comprising an authorization key;
    delete the issued card by deleting, using the authorization key, a supplementary security domain (SSD) and an applet that are stored in the card IC chip, wherein the deleted card is a first card, wherein the card information of the deleted card is first card information, wherein the SSD of the deleted card is a first SSD, wherein the applet of the deleted card is a first applet;
    after deleting the issued card, transmit, via the communication interface, a confirmation message;
    after the transmitting of the confirmation message, receive a card issuance command, wherein the card issuance command comprises a security key and second card information; and
    associate a second card to the card IC chip, by generating, on the card IC chip and using the security key, a second SSD and a second applet that correspond to the second card information.

2. The ETCS terminal according to claim 1, wherein the user input received via the communication interface is a first user input,
  wherein the ETCS terminal further comprises an input interface configured to receive a second user input, and
  wherein the controller is configured to activate at least one of the card IC chip or the card socket further based on the second user input.

3. The ETCS terminal according to claim 1,
  wherein the card IC chip is activated based on the user input received via the communication interface; and
  wherein the controller is further configured to, after the card IC chip is activated, process a toll payment via the issued card.

4. The ETCS terminal according to claim 1,
  wherein the card socket is activated based on the user input received via the communication interface; and
  wherein the controller is configured to, after the card socket is activated, process a toll payment via the payment card inserted into the card socket.

5. The ETCS terminal according to claim 1, wherein the controller is further configured to:
  receive a first card issuance command, wherein the first card issuance command comprises a first security key and the first card information; and
  associate the issued card to the card IC chip, by generating, on the card IC chip and using the first security key, the first SSD and the first applet that correspond to the first card information.

6. The ETCS terminal according to claim 1, wherein the controller is further configured to transmit, to a server and via the communication interface, card management information corresponding to the issued card.

7. The ETCS terminal according to claim 6, wherein the card management information comprises at least one of card identification information, card lifecycle information, card company information, card issuance information, or card status information.

8. A method comprising:
  identifying, by an electronic toll collection system (ETCS) terminal associated with a vehicle, a payment card inserted into a card socket of the ETCS terminal, wherein the ETCS comprises a card integrated circuit (IC) chip storing card information of an issued card;
  receiving, by the ETCS terminal and via a communication interface connected to a vehicle network of the vehicle, a user input;
  activating, by the ETCS terminal and based on the user input, at least one of the card IC chip or the card socket;
  receiving a card deletion command comprising an authorization key;
  deleting the issued card by deleting, using the authorization key, a supplementary security domain (SSD) and an applet that are stored in the card IC chip, wherein the deleted card is a first card, wherein the card information of the deleted card is first card information, wherein the SSD of the deleted card is a first SSD, wherein the applet of the deleted card is a first applet;
  after deleting the issued card, transmitting, via the communication interface, a confirmation message;
  after the transmitting the confirmation message, receiving a card issuance command, wherein the card issuance command comprises a security key and second card information; and
issuing a second card to the card IC chip, by generating, on the card IC chip and using the security key, a second SSD and a second applet that correspond to the second card information.

9. The method according to claim 8, wherein the user input received via the communication interface is a first user input, and wherein the activating of the at least one of the card IC chip or the card socket is further based on a second user input received via an input interface of the ETCS terminal.

10. The method according to claim 8,
  wherein the card IC chip is activated based on the user input received via the communication interface; and
  wherein the method further comprises, after the card IC chip is activated, processing a toll payment via the issued card.

11. The method according to claim 8,
  wherein the card socket is activated based on the user input received via the communication interface; and
  wherein the method further comprises, after the card socket is activated, processing a toll payment via the payment card inserted into the card socket.

12. The method according to claim 8, further comprising:
  receiving a first card issuance command, wherein the first card issuance command comprises a first security key and the first card information; and
  issuing a card to the card IC chip, by generating, on the card IC chip and using the first security key, the first SSD and the first applet that correspond to the first card information.

13. The method according to claim 8, further comprising transmitting, to a server and via the communication interface, card management information corresponding to the issued card.

14. The method according to claim 13, wherein the card management information comprises at least one of card identification information, card lifecycle information, card company information, card issuance information, or card status information.

15. A non-transitory computer-readable medium storing instructions that, when executed, cause an electronic toll collection system (ETCS) terminal to:
  activate, based on a user input received via a communication interface of the ETCS terminal at least one of a card integrated circuit (IC) chip of the ETCS terminal or a card socket of the ETCS terminal, wherein the IC chip is configured to store card information of an issued card, wherein the card socket is configured to accommodate insertion of a payment card, wherein the ETCS terminal is associated with a vehicle, and wherein the communication interface is connected to a vehicle network of the vehicle;
  receive a card deletion command comprising an authorization key;
  delete the issued card by deleting, using the authorization key, a supplementary security domain (SSD) and an applet that are stored in the card IC chip, wherein the deleted card is a first card, wherein the card information of the deleted card is first card information, wherein the SSD of the deleted card is a first SSD, wherein the applet of the deleted card is a first applet;
  after deleting the issued card, transmit, via the communication interface, a confirmation message;
  after the transmitting of the confirmation message, receive a card issuance command, wherein the card issuance command comprises a security key and second card information; and
  associate a second card to the card IC chip, by generating, on the card IC chip and using the security key, a second SSD and a second applet that correspond to the second card information.

16. The non-transitory computer-readable medium according to claim 15, wherein the user input received via the communication interface is a first user input,
  wherein the instructions, when executed, cause the ETCS terminal to:
    receive, via an input interface, a second user input; and
    activate at least one of the card IC chip or the card socket further based on the second user input.

17. The non-transitory computer-readable medium according to claim 15, wherein the card IC chip is activated based on the user input received via the communication interface; and
  wherein the instructions, when executed, cause the ETCS terminal to, after the card IC chip is activated, process a toll payment via the issued card.

18. The non-transitory computer-readable medium according to claim 15, wherein the card socket is activated based on the user input received via the communication interface; and wherein the instructions, when executed, cause the ETCS terminal to, after the card socket is activated, process a toll payment via a payment card inserted into the card socket.

19. The non-transitory computer-readable medium according to claim 15, wherein the instructions, when executed, cause the ETCS terminal to transmit, to a server and via the communication interface, card management information corresponding to the issued card.

20. The non-transitory computer-readable medium according to claim 19, wherein the card management information comprises at least one of card identification information, card lifecycle information, card company information, card issuance information, or card status information.

* * * * *